United States Patent

Ozaki et al.

Patent Number: 5,748,345
Date of Patent: May 5, 1998

[54] IMAGE PROCESSING APPARATUS FOR PERFORMING IMAGE PROCESSING ACCORDING TO COLORS OF INPUT IMAGE

[75] Inventors: Hidenori Ozaki, Kawasaki; Hideaki Shimizu, Yokohama, both of Japan

[73] Assignee: Canon Kabushiki Kaisha, Tokyo, Japan

[21] Appl. No.: 396,062

[22] Filed: Feb. 28, 1995

Related U.S. Application Data

[63] Continuation of Ser. No. 117,679, Sep. 8, 1993, abandoned.

[30] Foreign Application Priority Data

Sep. 8, 1992 [JP] Japan ................. 4-239405

[51] Int. Cl.$^6$ .................................................. H04N 1/46
[52] U.S. Cl. ................... 358/537; 358/500; 358/501; 358/452; 382/162
[58] Field of Search ...................... 358/520, 537, 358/538, 526, 515, 518, 512, 501; 382/162, 164, 165, 167

[56] References Cited

U.S. PATENT DOCUMENTS

| | | |
|---|---|---|
| 4,516,155 | 5/1985 | Hennig et al. .................. 358/531 |
| 4,937,662 | 6/1990 | Matsunawa et al. ............ 358/538 |
| 5,016,096 | 5/1991 | Matsunawa et al. ............ 358/538 |
| 5,134,667 | 7/1992 | Suzuki .............................. 382/22 |
| 5,136,401 | 8/1992 | Yamamoto et al. ............. 358/518 |
| 5,177,795 | 1/1993 | Tanioka et al. .................. 358/450 |
| 5,194,945 | 3/1993 | Kadowaki et al. .............. 358/520 |
| 5,200,832 | 4/1993 | Taniuchi et al. ................. 358/537 |
| 5,216,498 | 6/1993 | Matsunawa et al. ............ 358/518 |
| 5,296,946 | 3/1994 | Kadowaki et al. .............. 358/531 |
| 5,327,262 | 7/1994 | Williams ......................... 358/462 |
| 5,465,307 | 11/1995 | Azumaya et al. ............... 358/538 |

*Primary Examiner*—Edward L. Coles, Sr.
*Assistant Examiner*—Madeleine Au Nguyen
*Attorney, Agent, or Firm*—Fitzpatrick, Cella, Harper & Scinto

[57] ABSTRACT

The controller unit 2a can perform in a color extraction mode and a marker processing mode. The color extraction mode is a mode in which an image within the range of a particular color is extracted and reproduced in that color. In the marker processing mode, an area surrounded by a color marker is detected and a prescribed processing is performed for an image in that area. A main-scan smoothing circuit 130 changes the number of pixels or the weighting coefficients used in smoothing in accordance with above described modes.

39 Claims, 12 Drawing Sheets

COLOR RANGE
IN REGULAR DISCRIMINATION

COLOR RANGE IN MARKER
AREA DISCRIMINATION

COLOR RANGE
IN REGULAR DISCRIMINATION

COLOR RANGE IN MARKER
AREA DISCRIMINATION

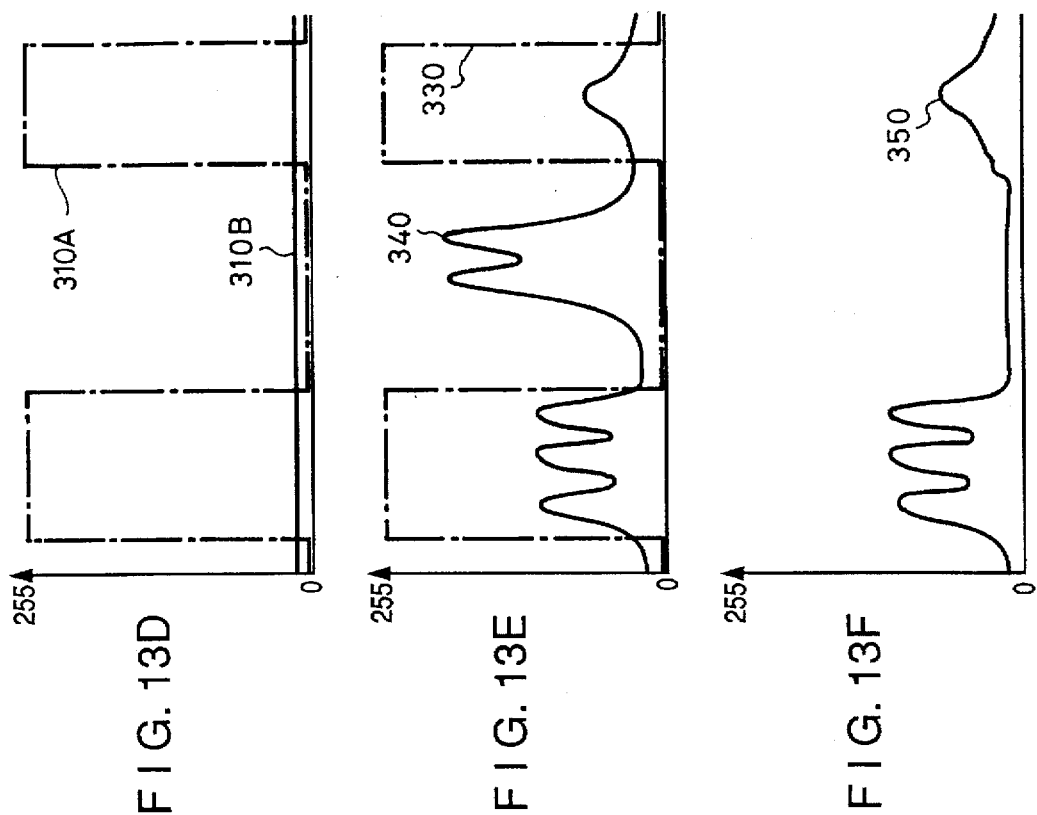
FIG. 13D
FIG. 13E
FIG. 13F
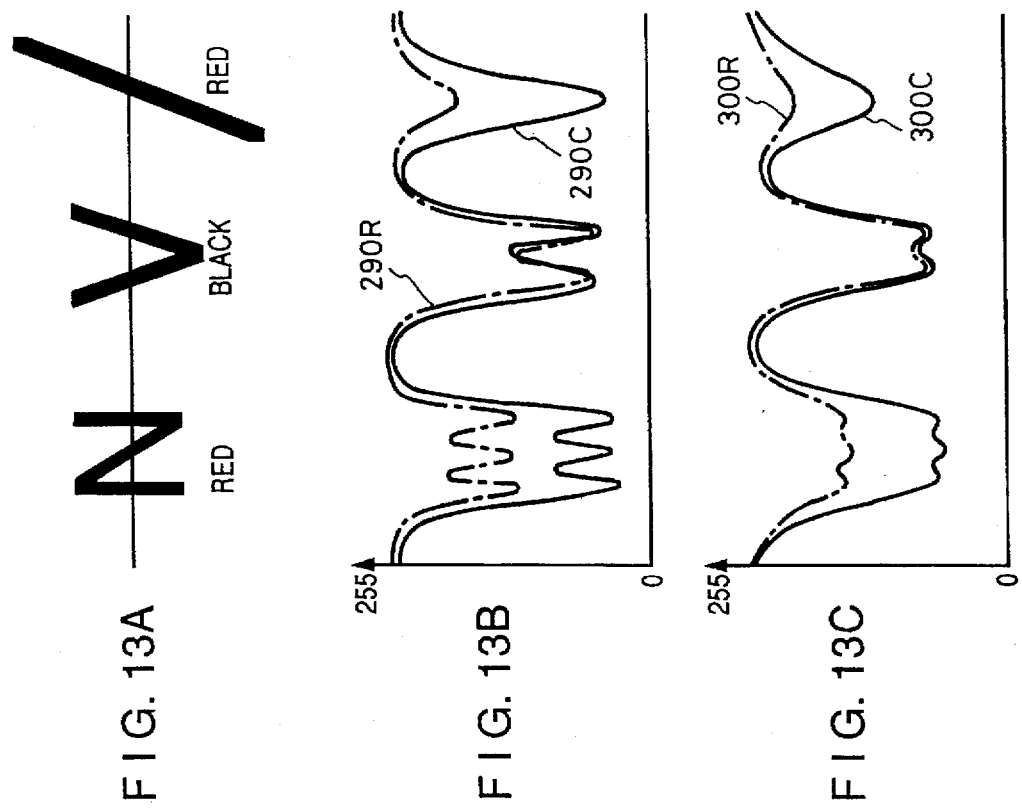
FIG. 13A
FIG. 13B
FIG. 13C 5,748,345

IMAGE PROCESSING APPARATUS FOR PERFORMING IMAGE PROCESSING ACCORDING TO COLORS OF INPUT IMAGE

This application is a continuation of application Ser. No. 08/117,679 filed Sep. 8, 1993, now abandoned.

BACKGROUND OF THE INVENTION

1. Field of the Invention

The present invention relates to an image processing apparatus for performing image processing according to the colors of an input image.

2. Description of the Related Art

Conventional image processing apparatuses read images by using a line sensor through filters of a plurality of colors and thereafter perform color discrimination processing. These conventional apparatuses perform erroneous discrimination elimination processing, but they perform exactly the same processing both in a mode of outputting an image within the range of a particular color and a mode of detecting an area surrounded by a color marker.

In the above conventional image processing apparatuses, because exactly the same erroneous discrimination elimination processing is performed in both modes if the level of the erroneous discrimination elimination processing is raised to eliminate erroneous discrimination of a color marker in the mode in which an area surrounded by a color marker is detected, deterioration occurs in portions of characters or thin lines of an image in the mode in which an image within the range of a specific color is output.

SUMMARY OF THE INVENTION

It is an object of the present invention to provide an image processing apparatus which solves the above conventional problem.

It is another object of the present invention to provide an image processing apparatus capable of selecting the level of erroneous discrimination elimination processing so as to eliminate erroneous discrimination of a color marker in a mode of detecting an area surrounded by a color marker, thereby performing image processing faithful to an original.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 13A to 13F are timing charts for explaining the signals shown in FIG. 5.

DESCRIPTION OF THE PREFERRED EMBODIMENT

The preferred embodiment of the present invention will be described in detail below with reference to the accompanying drawings.

[Overall arrangement of apparatus and summary of operation]

Figure 1:
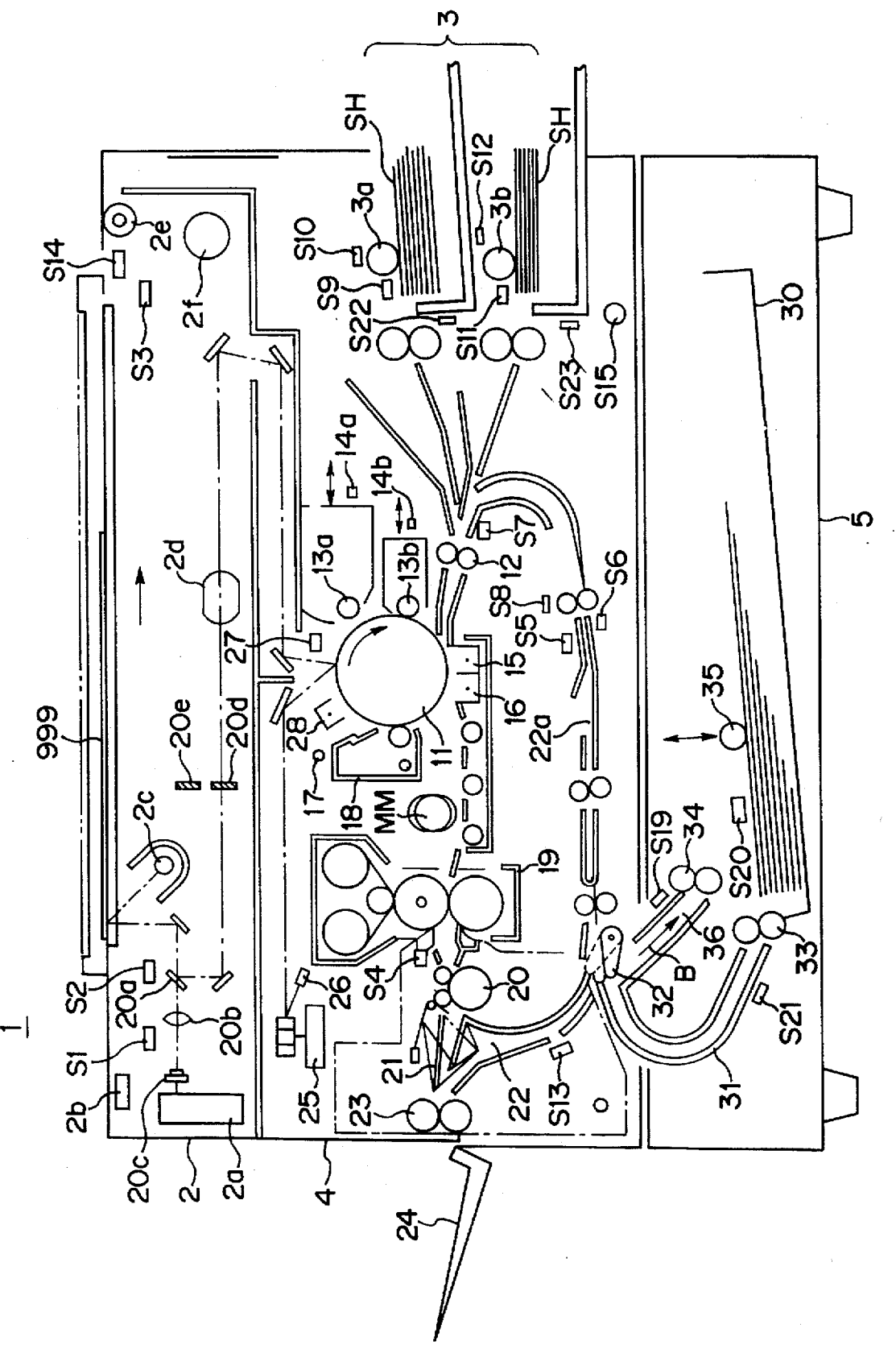
FIG. 1 is a sectional view showing the arrangement of a copying apparatus as an image forming apparatus according to an embodiment of the present invention.

FIG. 1 is a sectional view showing the arrangement of a copying apparatus according to the embodiment of the present invention. Referring to FIG. 1, a copying apparatus main body 1 comprises an original scanning unit 2, a paper feed unit 3, an image recording unit 4, and an intermediate tray unit 5. The arrangement of the original scanning unit 2 will be described first.

A controller unit 2a of the original scanning unit 2 comprises means for controlling a whole copying sequence and image processing means for processing image signals read by a CCD line sensor 20c. An original exposing lamp 2c, together with a scanning mirror, constitute an optical scanning system which moves to perform scan at a predetermined velocity. The original scanning unit 2 includes a power switch 2b.

Light transmitted through a half mirror 20a is photoelectrically converted by the CCD line sensor 20c through a CCD image forming lens 20b and supplied as an image electrical signal to the image processing means of the controller unit 2a. Light reflected by the half mirror 20a, on the other hand, is supplied to an image forming lens 2d through a red filter 20d for removing red, a blue filter 20e for removing blue, or a passage having neither a filter nor a shutter. The image forming lens 2d forms an image of the reflected light from the half mirror 20a onto a photosensitive drum 11 of the image recording unit 4. That is, the copying apparatus according to this embodiment performs analog image recording.

A buzzer 2e generates an alarm sound for informing a copy mode error and the like set by an operating unit (to be described later). An optical system driving motor 2f drives the optical scanning system and the like with a high precision. The paper feed unit 3 feeds cut sheets SH to inside the image recording unit 4 by driving paper feed rollers 3a and 3b.

The arrangement of the image recording unit 4 will be described below.

Register rollers 12 at rest temporarily stop the leading end of a cut sheet SH fed by the paper feed rollers 3a and 3b. After synchronization is made to match the leading end of the cut sheet SH with the leading end of an image, the register rollers 12 are rotated to feed the cut sheet SH toward the photosensitive drum 11. Developing units 13a and 13b contain developers of their respective colors (red and black). Solenoids 14a and 14b are driven to selectively locate one of the developing units 13a and 13b in the vicinity of the photosensitive drum 11 and move the other away from the photosensitive drum 11. In performing multiple development, the controller unit 2a controls driving of the solenoids 14a and 14b to cause them to perform development of their respective colors.

A transfer charger 15 transfers a toner image developed by the developing units 13a and 13b onto the cut sheet SH. The cut sheet SH on which the toner image is thus transferred is separated from the photosensitive drum 11 by a separating charger 16.

A pre-exposure lamp 17 neutralizes the surface potential of the photosensitive drum 11 to prepare for primary charging. A cleaner unit 18 constituted by a cleaning blade and a cleaning roller recovers any toner remaining on the photosensitive drum 11. The toner image transferred to the cut sheet SH is fixed by heat and pressure by a fixing device 19. A conveyor roller 20 conveys the cut sheet SH subjected to the fixing process to a paper delivery tray 24.

In multiple copying, a flapper 21 is switched to a position indicated by a dotted line by an operation of a solenoid (not shown). Therefore, the cut sheet SH subjected to the paper feed, transfer, separation, and fixing processes is conveyed in a conveyance direction 22a through a conveyor path 22. After a sensor S5 detects the cut sheet, a solenoid (not shown) for lateral registration performs positioning in the lateral direction for the cut sheet on the basis of detection results from sensors S6 and S8.

The register rollers 12 are then driven to feed the cut sheet SH by a copy start command from an operating unit 41. The cut sheet thus fed is delivered to the paper delivery tray 24 in the same manner as described above.

In double-side copying, a cut sheet SH is first fed by paper delivery rollers 23 in the same manner as in the regular copying operation described above. When the trailing end of the cut sheet SH passes through the flapper 21, the paper delivery rollers 23 are driven in the opposite direction. The cut sheet SH is therefore conveyed to the conveyor path 22 while being guided by the flapper 21. This reverse driving of the paper delivery rollers 23 is performed by a solenoid (not shown) for performing switching between the forward and reverse rotations. The subsequent operation is identical with the multiple copying operation described above.

In the case of double-side copying, as described above, a cut sheet SH is once delivered outside the copying machine by the paper delivery rollers 23 and then conveyed in the conveyance direction 22a by the reverse driving of the paper delivery rollers 23 with its upper and lower surfaces reversed.

The multiple copying operation and the double-side copying operation performed for one cut sheet have been described above. To perform the multiple copying or the double-side copying for a plurality of cut sheets, the intermediate tray unit 5 is used. As shown in FIG. 1, the intermediate tray unit 5 has an intermediate tray 30 for temporarily containing cut sheets SH on a conveyor path 31. In the multiple copying for a plurality of cut sheets, the cut sheet SH subjected to the fixing process is in part delivered outside the apparatus by the paper delivery rollers 23 under the same control as in the double-side copying for a single cut sheet described above. Thereafter, the paper delivery rollers 23 are rotated in the reverse direction to convey the cut sheet SH to the intermediate tray 30 through the conveyor path 22, a flapper 32, and a conveyor path 36, and the cut sheet SH is thereby contained in the intermediate tray 30.

The above operation is repeatedly executed to contain all the cut sheets subjected to the first-side copying operation into the intermediate tray 30. Thereafter, a pickup roller 35 and paper feed rollers 33 are driven by the next copy command, executing the second-side copying operation. In the case of double-side copying for a plurality of cut sheets, cut sheets SH are conveyed by the flapper 21 from the fixing device 19 to the intermediate tray 30 through the conveyor paths 22 and 36 and thereby contained in the intermediate tray 30.

The subsequent operation is identical with the multiple copying operation described above and a detailed description thereof will be omitted.

A scanner motor 25 rotates a rotary polygon mirror at a predetermined speed to deflect a laser beam emitted from a semiconductor laser 26. The scanner motor 25, the semiconductor laser 26, and the like constitute a digital scanning unit. The digital scanning unit emits a laser beam corresponding to input digital image information from the image processing means of the controller unit 2a, recording a superposed image of this digital image and the image obtained by the analog image recording mentioned earlier. In the analog image recording, the digital scanning unit also radiates a laser beam onto a latent image area recorded on the photosensitive drum 11, thereby selectively erasing the latent image.

An exposure shutter 27 blocks reflected image light partially or entirely, thereby regulating the latent image area. A primary charger 28 is also provided in the apparatus. Of sensors S1 to S15 and S19 to S23 shown in FIG. 1, the sensor S1 senses the home position of an optical system serving as an analog scanning unit. While the apparatus is standing by, the optical system is stopped at that position. The sensor S2 detects that the optical system moves to a position corresponding to the position of the leading end of an original image. The timing of a copy sequence is controlled by the output from this sensor. The sensor S3 senses a limiter position (reversal position) during maximum scanning.

The optical system reciprocates with a scan length and a scan rate according to a cassette size and a magnification designated by a scanning unit (to be described later).

Figure 2:
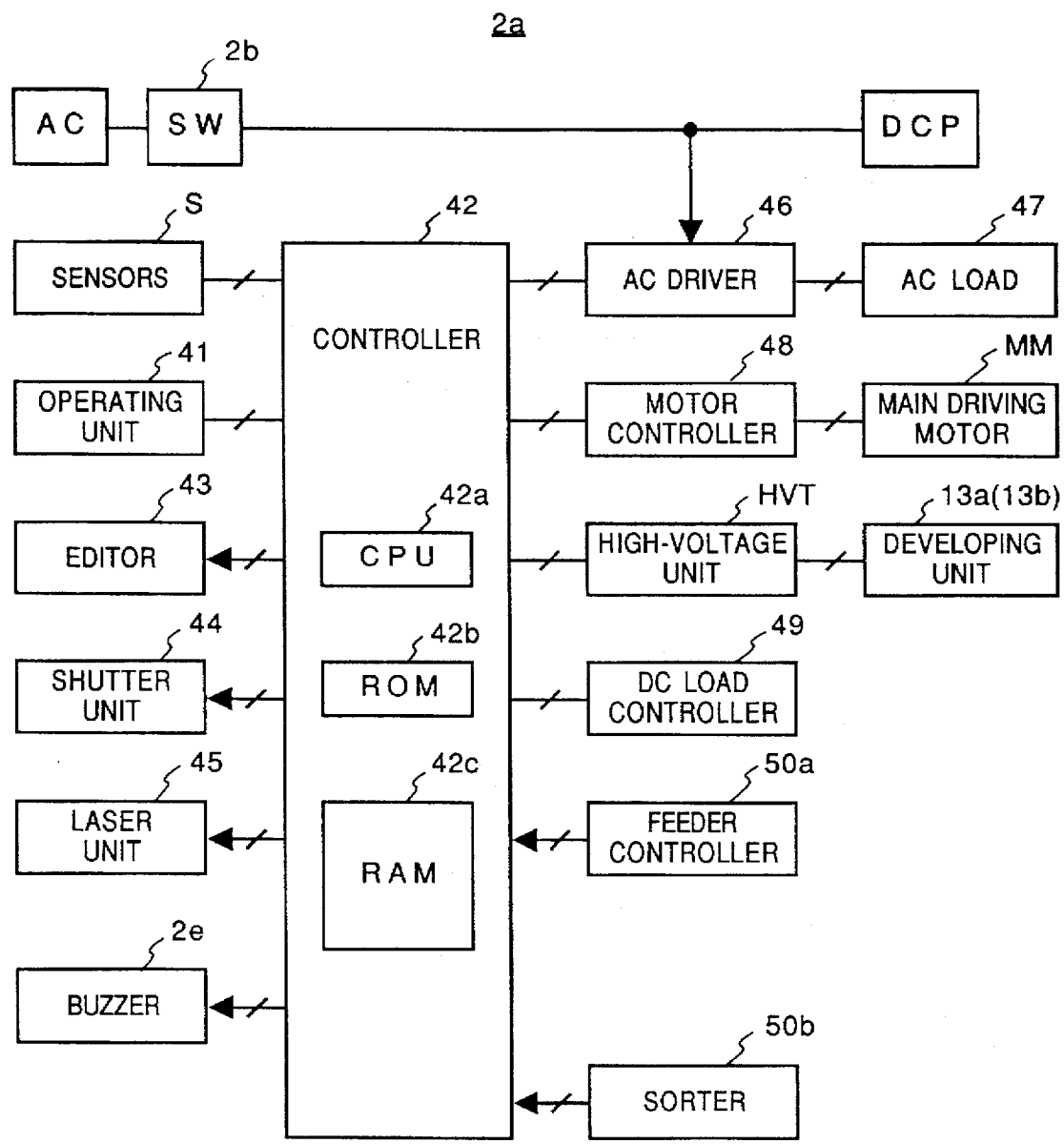
FIG. 2 is a block diagram showing a controller unit 2a of the copying apparatus according to the embodiment.
Figure 3:
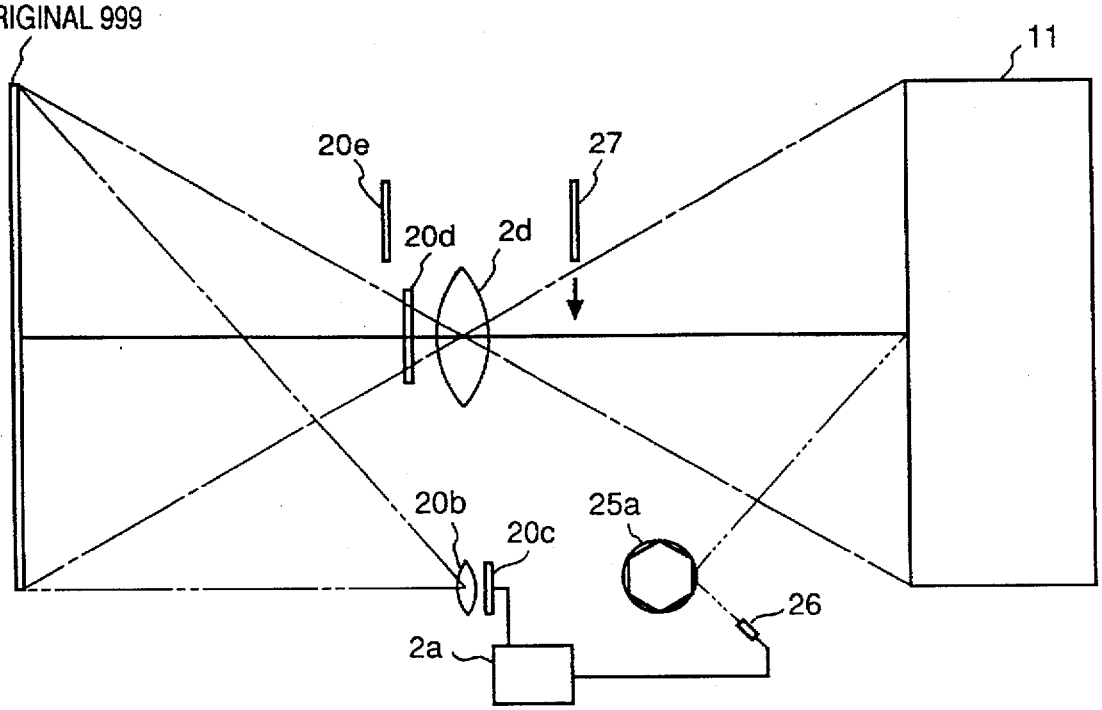
FIG. 3 is a block diagram showing the arrangement of an original scanning system according to the embodiment.

FIG. 2 is a block diagram showing the controller unit 2a of the copying apparatus shown in FIG. 1. In FIG. 2, the same reference numerals as in the apparatus shown in FIG. 1 denote the same parts.

Referring to FIG. 2, the operating unit 41 has a key for setting copy modes (e.g., a single-side copy mode, a double-side copy mode, and a multiple copy mode), a key for setting a first recording mode of superposing digital information, which is stored beforehand by the digital scanning unit, on all documents fed from an automatic document feeder (ADF), a key for setting a second recording mode of superposing digital information, which is stored beforehand by the digital scanning unit, on only a particular document fed from the ADF, a key for setting a color extraction mode of extracting an image within the range of a specific color and reproducing the image in that color, and a key for setting a marker processing mode of detecting an area surrounded by a color marker and performing predetermined processing for an image in that area.

A controller 42 comprises a CPU 42a, a ROM 42b, a RAM 42c, and the like and controls the whole copying sequence on the basis of control programs stored in the ROM 42b. An editor 43 inputs an area designation command for a predetermined area of an original. A shutter unit 44 is constituted by the exposure shutter 27 and a solenoid.

A laser unit 45 includes the semiconductor laser 26, the scanner motor 25, and the like. An AC driver 46 supplies AC power to an AC load 47, such as the original exposing lamp 2c. A motor controller 48 controls driving of the motor. A DC load controller 49 controls driving of, e.g., the solenoids 14a and 14b, a clutch, and a fan. A feeder controller 50a controls driving of the original feeding unit, and a sorter 50b delivers cut sheets SH conveyed by the paper delivery rollers 23 to a designated bin.

A high-voltage unit HVT applies a predetermined voltage to the charging system and the developing sleeves of the developing units 13a and 13b. A DC power source DCP supplies a control voltage (+5 V) to the controller unit 2a and the like.

When the power switch 2b is turned on, an internal heater of the fixing device 19 is powered, and the apparatus waits until the fixing roller reaches a predetermined temperature at which fixing is possible (wait time). When the fixing roller reaches the predetermined temperature, a main driving motor MM is driven for a predetermined time period to drive, e.g., the photosensitive drum 11 and the fixing device 19, thereby setting the rollers inside the fixing device 19 at an even temperature (wait release rotation).

Thereafter, the main driving motor MM is stopped, and the apparatus stands by in a copy enable state (standby state). The main driving motor MM then drives the photosensitive drum 11, the fixing device 19, the developing units 13a and 13b, and the various copy paper conveyor rollers. When a copy command is applied from the operating unit 41, the copy sequence is started.

[Operations in image recording]

Operations in image recording performed by the copying apparatus according to this embodiment will be described in detail below.

In regular image recording, a latent image is formed on the drum 11 without using the optical filters 20d and 20e. At this point, the semiconductor laser 26 can partially erase an image by radiating a laser beam onto a given preset area of the image. If a reddish color erasure mode is selected, the optical red filter 20d is set in the path of reflected light from an original, thereby performing image recording by erasing reddish colors. Likewise, if a bluish color erasure mode is selected, image recording is performed by using the optical blue filter 20e.

A practical example of processing when automatic color separation between red and black is performed will be described in an order of:

1. Formation of latent image of black image
2. Development of black image
3. Discrimination of red image
4. Formation of latent image of red image
5. Development of red image
6. Marker processing 1. Formation of latent image of black image First, as a pre-operation for forming a latent image of a black image, the optical red filter 20d is set in front of the image forming lens 2d. The original exposing lamp 2c and the scanning mirror are moved in a direction indicated by an arrow b in FIG. 1 by the optical system driving motor (optical motor) 2f while exposing an original 999 including red information.

The reflected light from the original 999 is reflected by the half mirror 20a and becomes incident on the optical red filter 20d. The optical red filter 20d erases the red information of the original 999. The reflected light from the original 999, from which the red information is erased, passes through the image forming lens 2d, and an image of the reflected light is formed on the photosensitive drum 11.

In this manner, the latent image of the information of the original 999 except for the red information is formed on the photosensitive drum 11.

2. Development of black image

A cut sheet SH is fed into the image recording unit 4 by the paper feed rollers 3a and 3b. The latent image except for the red information formed on the photosensitive drum 11 is developed by the black developing unit 13a and transferred onto the cut sheet SH. After the latent image is transferred, the cut sheet SH is separated from the photosensitive drum 11 by the separating charger 16. Any toner remaining on the photosensitive drum 11 is recovered by the cleaner unit 18.

The black toner image on the cut sheet SH subjected to the development and the separation is fixed by heat and pressure by the fixing device 19. The cut sheet SH on which the black information is thus recorded is conveyed to the conveyor path 22 by the flapper 21 in order to perform the next development. The cut sheet SH is conveyed from the conveyor path 22 to the register rollers 12 through the conveyor path 22a.

3. Discrimination of red image

To perform discrimination of a red image, the shutter 27 is closed. Closing the shutter 27 blocks optical information from the image forming lens.

The original exposing lamp 2c and the scanning mirror are moved in a direction indicated by an arrow a shown in FIG. 1 by the optical system driving motor (optical motor) 2f while exposing the original 999. The reflected light from the original 999 passes through the half mirror 20a, and an image of the reflected light is formed on the CCD line sensor 20c by the lens 20b.

Figure 4:
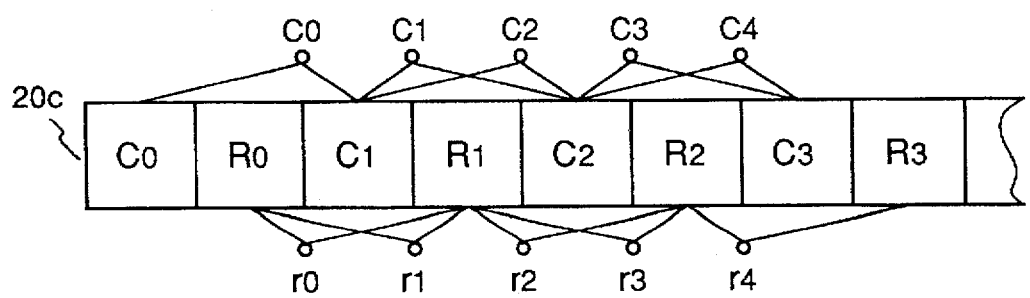
FIG. 4 is a schematic view showing the arrangement of a CCD line sensor 20c of the copying apparatus according to the embodiment.

FIG. 4 is a schematic view showing the arrangement of the CCD line sensor 20c of the copying apparatus according to this embodiment. As shown in FIG. 4, red optical filters and cyan optical filters are fitted alternately in the CCD line sensor 20c. The reflected light from an original is separated into two directions by a prism (not shown) after passing through the lens 20b. One light component passes through the cyan filters, while the other passes through the red filters, thereby forming an image on the CCD line sensor 20c.

Electric charges of all pixels stored for a predetermined time in this line sensor 20c are transferred to a shift register (not shown) at one time and output as image signals in accordance with shift clocks CLK. The output image signals from the CCD line sensor 20c are supplied as analog electrical signals to the controller 2a.

Figure 5:
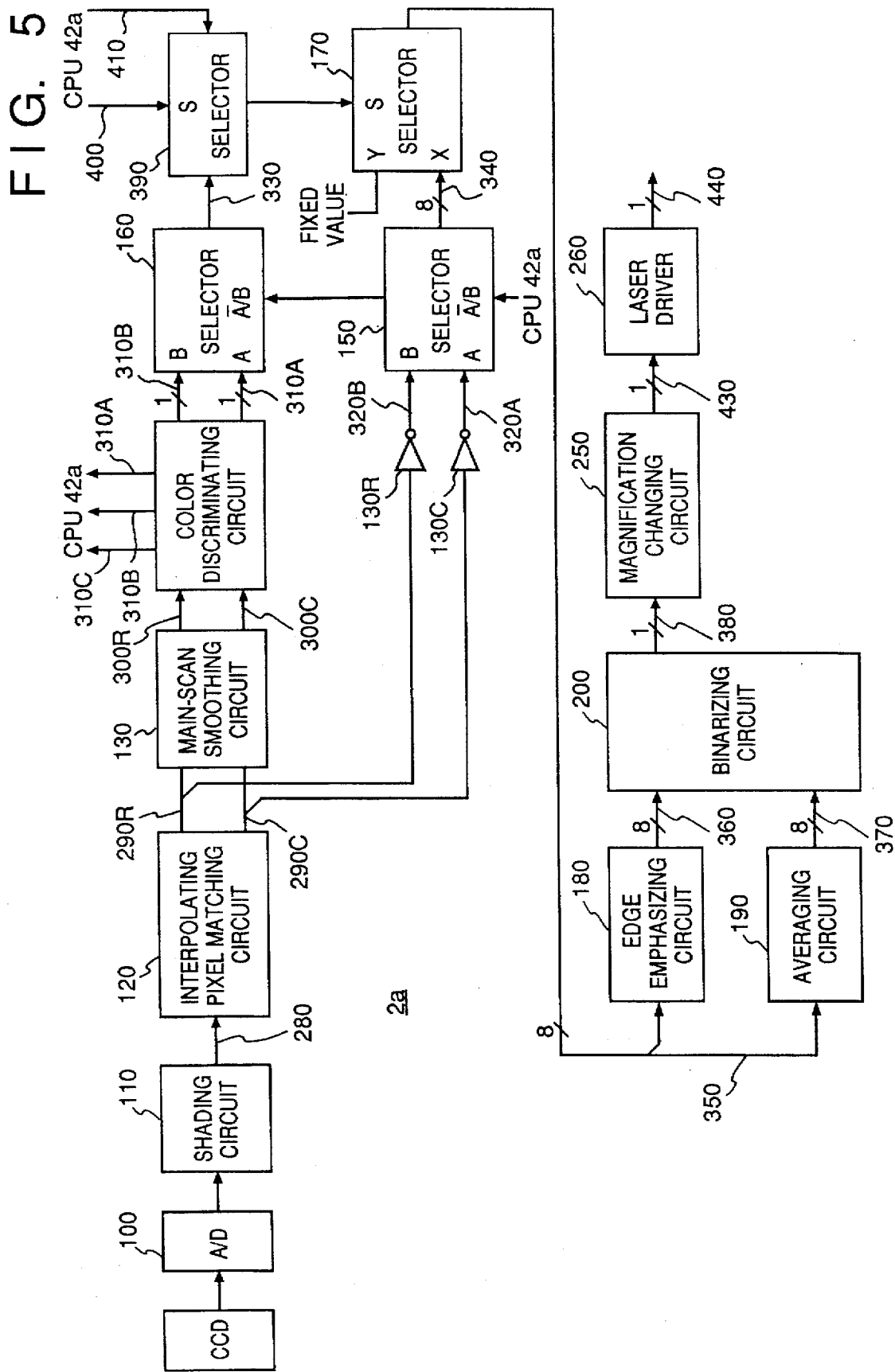
FIG. 5 is a block diagram showing an image processing unit of the controller unit according to the embodiment.

FIG. 5 is a block diagram showing the image processing unit of the controller unit 2a. Referring to FIG. 5, the image signals (an R signal and a C signal) from the CCD line sensor 20c are subjected to analog-to-digital conversion performed by an A/D converter 100. Consequently, each signal is converted into 8-bit digital information. The output from the A/D converter 100 is supplied to a shading circuit 110. The shading circuit 110 corrects sensitivity variations of the CCD line sensor 20c or light amount variations of the original exposing lamp 2c.

An output 280 from the shading circuit 110 is supplied to an interpolating pixel matching circuit 120 which performs positional correction for the red and cyan pixels described above. That is, the interpolating pixel matching circuit 120 obtains virtual pixels (r0, r1, r2, . . . ) from red pixels (R0, R1, R2, . . . ) shown in FIG. 4 and virtual pixels (c0, c1, c2, . . . ) from cyan pixels (C0, C1, C2, . . . ) shown in FIG. 4.

The interpolating pixel matching circuit 120 performs a weighting operation of $rn=(3R_n+R_{n+1})/4$ or $rm=(3R_{m-1}+3R_m)/4$ for the red virtual pixels and a weighting operation of $cn=(C_n+3C_{n+1})/4$ or $cm \mu(3C_{m-1}+C_m)/4$ for the cyan virtual pixels. Note that n=0, 1, 4, ..., and m=1, 3, 5, ...

As described above, information of one pixel is obtained from information of two pixels from the line sensor 20c by the linear interpolation using the weighting operation, thereby doubling the number of pixels. The interpolating pixel matching circuit 120, therefore, has an effect of doubling the resolution of an image while performing the pixel positional correction. In addition, this interpolating pixel matching circuit 120 realizes equal MTF (spatial frequency transmission characteristics) between red and cyan without producing any difference in the MTF which is apt to occur during the interpolation.

Figure 6:
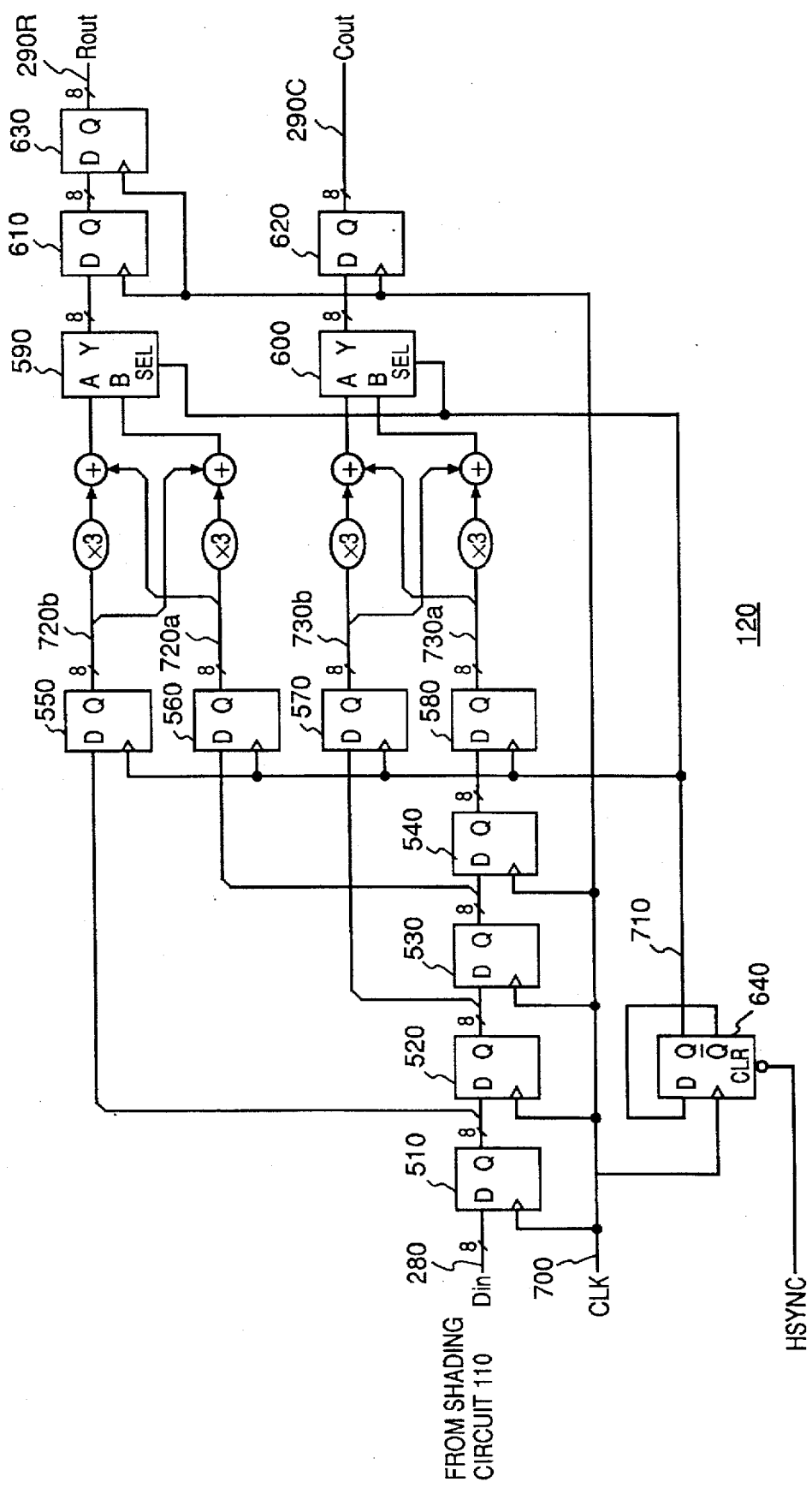
FIG. 6 is a circuit diagram showing the hardware arrangement of an interpolating pixel matching circuit according to the embodiment.

FIG. 6 is a circuit diagram showing the interpolating pixel matching circuit 120.

As the 8-bit image signal 280 from the shading circuit 110, the R signal and the C signal are supplied alternately in synchronism with clocks. These signals are supplied in sequence to D flip-flops 510, 520, 530, and 540, and signals of four pixels are latched. These latched signals are then supplied to D flip-flops 550, 560, 570, and 580.

These D flip-flops 550, 560, 570, and 580 are synchronized with each other by a frequency-divided signal 710 formed by frequency-dividing a clock signal 700 by a D flip-flop 640. Of the image information, red image information are latched by the D flip-flops 550 and 560, and cyan image information are latched by the D flip-flops 570 and 580. Red image information 720a and 720b latched by the D flip-flops 550 and 560 are subjected to the following arithmetic operations:

$$A = 720a + 720b \times 3 \quad (1)$$

$$B = 720a \times 3 + 720b \quad (2)$$

The ¼ of each operation result obtained by dropping the two lower bits is supplied to a selector 590. Similar arithmetic operations are performed for cyan image information 720c and 720d, and the operation results are supplied to a selector 600.

The selectors 590 and 600 alternately select the operation results A and B in accordance with the signal 710 and supply the results to wave-shaping D flip-flops 610 and 620, respectively. A D flip-flop 630 is used to match the pixel timings of the R and C signals.

A red signal 290R and a cyan signal 290C are output by performing the interpolating pixel matching as described above. As shown in FIG. 5, these output signals 290R and 290C are supplied to a main-scan smoothing circuit 130 and inverter circuits 130R and 130C.

The main-scan smoothing circuit 130 performs smoothing processing for the pixels of the red and cyan signals 290R and 290C, thereby removing noise components in the main-scanning direction of the image information to prevent erroneous determination in color discrimination. For example, in 5-pixel smoothing processing when pixel data are arranged in an order of d, b, a, c, and e in the main-scanning direction, the value of the pixel a of interest is calculated by a $=(d+2b+2a+2c+e)/8$ using weighting coefficients of 1, 2, 2, 2, and 1.

Figure 7:
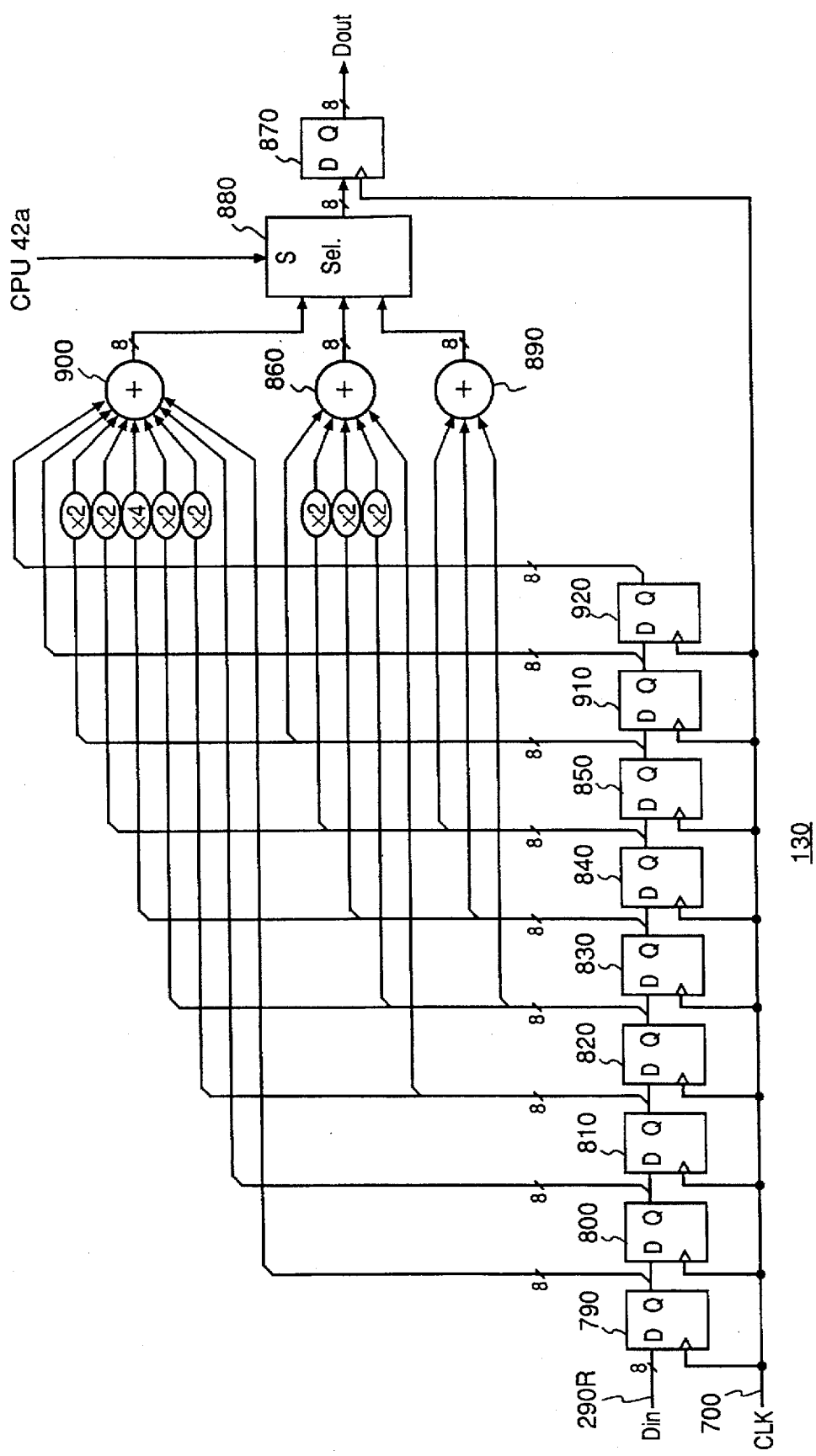
FIG. 7 is a circuit diagram showing the hardware arrangement of a main-scan smoothing circuit according to the embodiment.

FIG. 7 is a circuit diagram showing the arrangement of the main-scan smoothing circuit 130. Note that common smoothing processing is performed for the R signal and the C signal independently of each other, so the processing for the R signal will be described below.

In 3-pixel smoothing, the output red signal 290R from the interpolating pixel matching circuit 120 is supplied to flip-flops 820, 830, and 840 of the main-scan smoothing circuit 130 in synchronism with clocks 700, thereby latching data of three pixels. These latched data are subjected to the weighting using coefficients of 1, 1, and 1 described above and added by an adder 890, and the sum is reduced to ⅓. The output from the adder 890 is output as an image signal 300R through a selector 880 at a timing obtained by a D flip-flop 870.

In 5-pixel smoothing, the output red signal 290R from the interpolating pixel matching circuit 120 is supplied to flip-flops 810 and 850 in addition to the flip-flops 820, 830, and 840 of the main-scan smoothing circuit 130 in synchronism with the clocks 700, thereby latching data of five pixels. These latched data are subjected to the weighting using coefficients of 1, 2, 2, 2, and 1 described above and added by an adder 860, and the ⅛ of the sum is obtained by dropping the three lower bits. The output from the adder 860 is output as the image signal 300R through the selector 880 at a timing obtained by the D flip-flop 870.

In 9-pixel smoothing, the output red signal 290R from the interpolating pixel matching circuit 120 is supplied to flip-flops 790, 800, 910, and 920 in addition to the flop-flops 810, 820, 830, 840, and 850 of the main-scan smoothing circuit 130 in synchronism with the clocks 700, thereby latching data of nine pixels. These latched data are subjected to the weighting using coefficients of 1, 1, 2, 2, 4, 2, 2, 1, and 1 described above and added by an adder 900, and the 1/16 of the sum is obtained by dropping the four lower bits. The output from the adder 900 is output as the image signal 300R through the selector 880 at a timing obtained by the D flip-flop 870.

One of the outcomes of the above 3-, 5-, and 9-pixel smoothing operations is selected by the selector 880 which is controlled by the CPU 42a, thereby changing the level of elimination of erroneous discrimination. This makes it possible to select the level of elimination of erroneous discrimination which is best suited to an original.

The CPU 42a switches the levels of the erroneous discrimination eliminating processing between a color extraction mode, in which an image within the range of a particular color is extracted and reproduced in that color, and a marker processing mode, in which an area surrounded by a color marker is detected and predetermined processing is performed for an image in that area. In the color extraction mode of outputting an image within the range of a specific color, the CPU 42a causes the selector 880 to select the output from the adder 890 so as to perform the 3-pixel smoothing in which no deterioration is caused in portions of characters or thin lines in an image. In the marker processing mode of detecting an area surrounded by a color marker, the CPU 42a causes the selector 880 to select the output from the adder 900 so as to perform the 9-pixel smoothing in which no erroneous determination of a color marker occurs.

Also in the case of the cyan signal, the image signal 300 is output after being smoothed in the same manner as described above.

The output signals 300R and 300C from the main-scan smoothing circuit 130 processed as described above are supplied to a color discriminating circuit 140.

The color discriminating circuit 140 outputs color discrimination signals 310A, 310B, and 310C from the input red digital information 300R (8 bits, 256 gradation levels) and the input cyan digital information 300C (8 bits, 256 gradation levels).

Color discriminating processing performed by the color discriminating circuit 140 is shown in FIGS. 8A, 8B, 9A, and 9B.

Figure 8A:
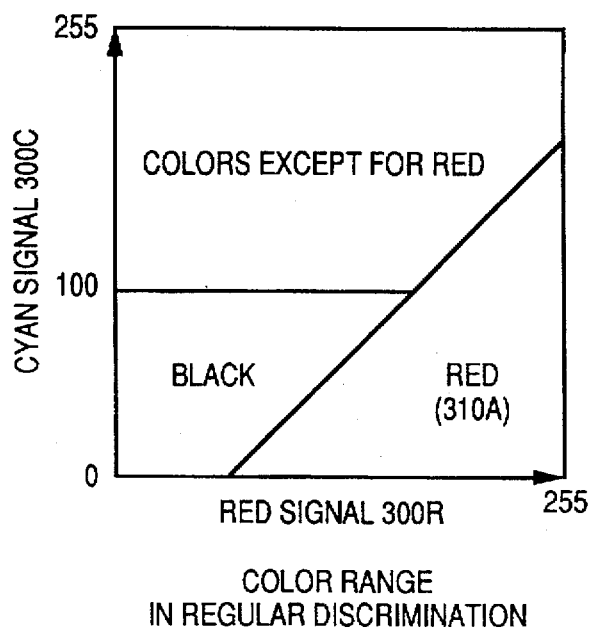
FIGS. 8A and 8B are schematic views showing LUTs for forming a red discrimination signal and a black discrimination signal according to the embodiment.
Figure 8B:
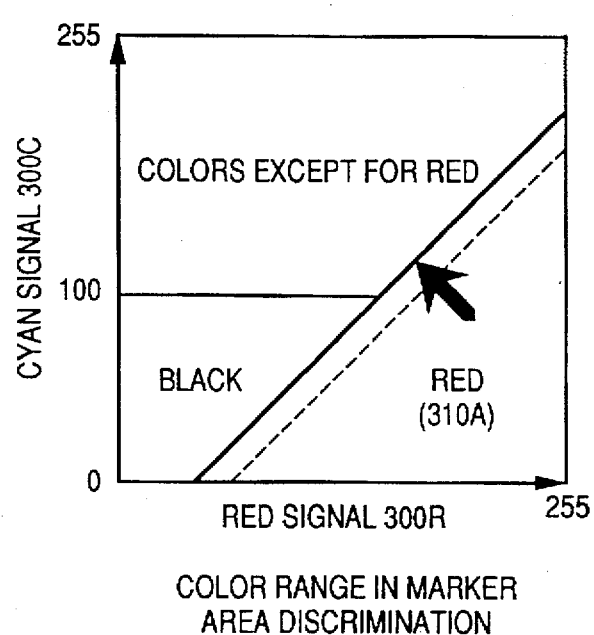
Figure 9A:
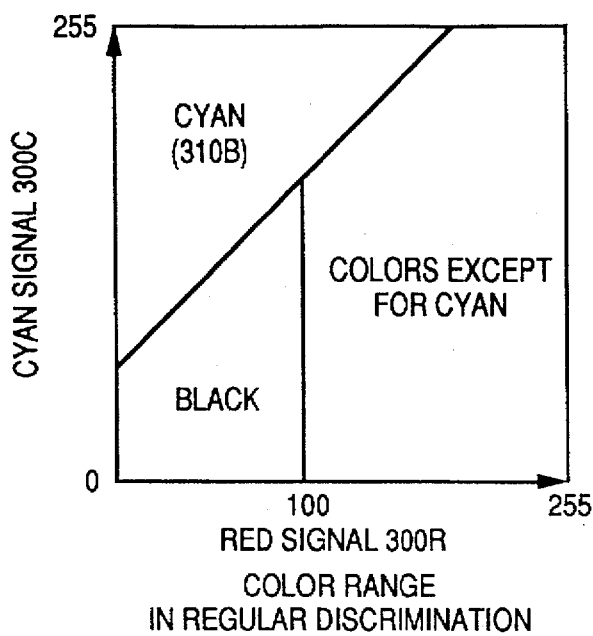
FIGS. 9A and 9B are schematic views showing LUTs for forming a cyan discrimination signal and a black discrimination signal according to the embodiment.
Figure 9B:
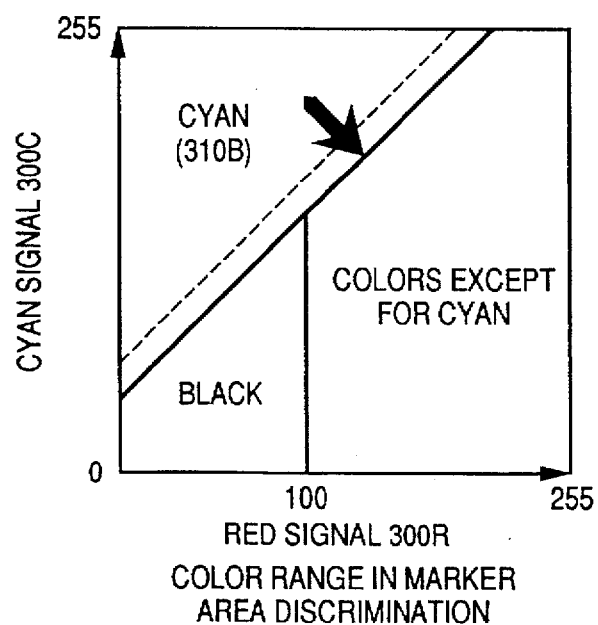

FIGS. 8A and 8B show look-up tables (LUTs) for generating the red discrimination signal 310A and the black discrimination signal 310C. FIGS. 9A and 9B show look-up tables (LUTs) for generating the cyan discrimination signal 310B and the black discrimination signal 310C. When the red signal 300R is "200" and the cyan signal 300C is "100," for example, these values fall within the range of red in the LUT shown in FIG. 8A, so the red discrimination signal 310A goes to "1".

In the LUT shown in FIG. 9A, on the other hand, since an area corresponding to these values is the area of colors except for cyan, the cyan discrimination signal 310B goes to "0".

The two LUTs shown in FIGS. 8A and 8B (9A and 9B) are provided to change the range of a color to be discriminated in accordance with a mode selected. The LUT shown in FIG. 8A (9A) is used in regular color discrimination. In the marker area determination mode, however, the LUT shown in FIG. 8B (9B) is used to discriminate light red (light cyan). This control is executed by the CPU 42a.

The LUTs shown in FIGS. 8A and 8B are used to discriminate between red and black in the color extraction mode and the marker mode, and the LUTs shown in FIGS. 9A and 9B are used to discriminate between cyan and black in these modes. However, the contents of these tables, particularly the manner the boundaries between the discrimination areas are defined are not limited to those shown in FIGS. 8A to 9B.

For example, if the area in which red is discriminated is widened in FIGS. 8A and 8B, the range of hue to be discriminated as red is also widened. Therefore, a plurality of red-and-black discriminating tables having different boundaries may be selectively used in accordance with the intended use of a user.

Referring to FIG. 5, the red signal 290R and the cyan signal 290C output from the interpolating pixel matching circuit 120 are inverted into signals 320B and 320A by the inverter circuits 130R and 130C, respectively. The signal 320B is the inversion of the red luminance signal 300R and hence serves as a cyan density signal. The signal 320A is the inversion of the cyan luminance signal 300C and hence serves as a red density signal. That is, these density signals 320A and 320B are not subjected to the main-scan smoothing processing in order to perform faithful binarization.

As described above, selectors 150 and 160 shown in FIG. 5 are controlled by the I/O port (not shown) of the CPU 42a. To perform reddish color separation in which reddish colors of an original are discriminated to reproduce an image in red, the control line is set to "0". To perform cyanic color separation in which cyanic colors of an original are discriminated to reproduce an image in cyan, the control line is set to "1". That is, when the reddish color separation is selected, the signal 310A is selected as a signal 330, and the signal 320A is selected as a signal 340.

An operation for performing the reddish color separation, i.e., an operation performed when the control line is at "0" will be described below.

Figure 10:
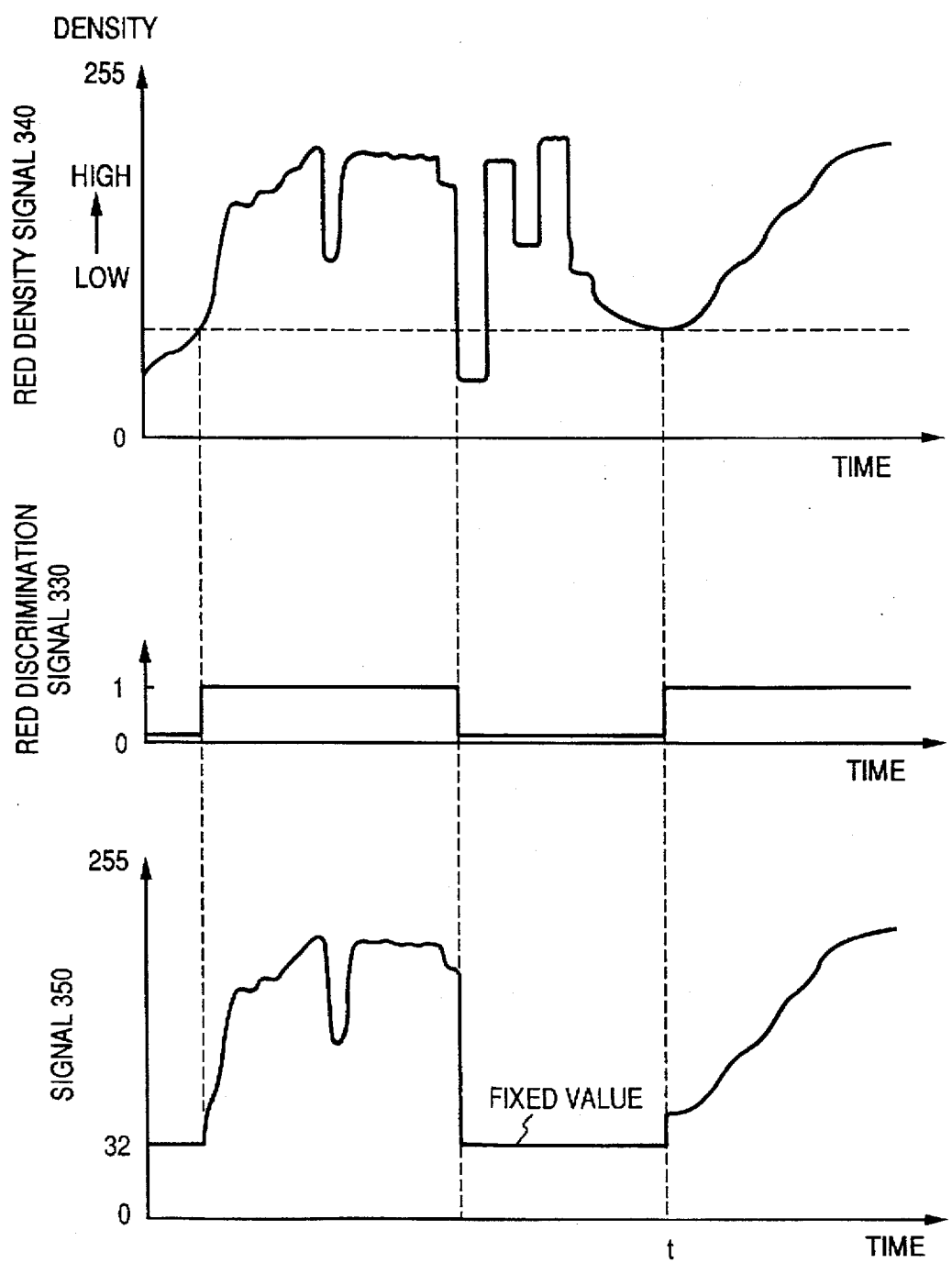
FIG. 10 is a timing chart showing density signal selection processing according to the embodiment.

The red density signal 340 selected by the selector 150 is applied to a terminal X of a selector 170, and a fixed value (in this case, "32") is supplied to a terminal Y of the selector 170. The red area signal 330 is supplied to a control terminal S of the selector 170. As shown in FIG. 10, if the signal level supplied to the control terminal S is "1", the red density signal 340 supplied to the terminal X is selected. If the signal level is "0", the fixed value supplied to the terminal Y is selected.

FIG. 13A shows an image on an original, and FIG. 13B is a view showing the red signal 290R and the cyan signal 290C on scanning lines of the original. FIG. 13C is a view showing the red signal 300R and the cyan signal 300C formed by smoothing the signals shown in FIG. 13B by the main-scan smoothing circuit 130. FIG. 13D is a view showing the red area signal 310A and the cyan area signal 310B formed by supplying the red signal 300R and the cyan signal 300C to the LUTs shown in FIGS. 8A to 9B and performing color discrimination. FIG. 13E is a view showing the red signal 340 and the red area signal 330 selected by the selector 160. FIG. 13F is a view showing a signal 350 obtained when the red signal 340 is selected by the selector 170.

As described above, if the erroneous discrimination elimination level of the main-scan smoothing circuit 130 is changed, the shapes of the signals 300R and 300C shown in FIG. 13C are also changed. In addition, if the positions of the boundaries between the discrimination areas of the color discriminating circuit 140 are changed, the shapes of the signals 310A and 310B shown in FIG. 13D are also changed.

In this arrangement, it is possible to change either one or both of the erroneous discrimination level of the main-scan smoothing circuit 130 and the positions of the boundaries between the discrimination areas of the color discriminating circuit 140 in accordance with whether the color extraction mode or the marker mode is selected.

The output signal 350 from the selector 170 is supplied to an edge emphasizing circuit 180 and an averaging circuit 190. This edge emphasizing circuit 180 comprises an edge emphasizing filter and emphasizes the edges of an image of the signal 350. The averaging circuit 190 averages pixels of interest of the signal 350 by using a 9×9 matrix. Output signals 360 and 370 from the edge emphasizing circuit 180 and the averaging circuit 190 are supplied to a binarizing circuit 200.

The binarizing circuit 200 compares the 8-bit output signal 360 from the edge emphasizing circuit 180 with the 8-bit output signal 370 from the averaging circuit 190, outputting a 1-bit red signal 380. Note that the dimensions of the filters for performing edge emphasis and smoothing are of course not limited to those described above.

As described above, since the image which is edge-emphasized is binarized by using an average value as a threshold value, binarization can be performed more faithfully.

4. Formation of latent image of red image

The output signal from the binarizing circuit 200 is supplied to a magnification changing circuit 250. The magnification changing circuit 250 performs predetermined enlargement or reduction in accordance with an instruction from the operating unit 41. An output signal 430 from the magnification changing circuit 250 is supplied to a laser driver circuit 260 to serve as a signal for driving the semiconductor laser 26. The semiconductor laser 26 converts an electrical signal from the laser driver circuit 260 into optical information. This optical information is reflected by a rotary polygon mirror 25a to form a latent image of the red information on the surface of the photosensitive drum 11.

5. Development of red image

The latent image of the red information formed on the drum 11 by the semiconductor laser 26 is developed by the red developing unit 13b. Conveyance of the cut sheet SH already subjected to black development and conveyed to the register rollers 12 is started at the start of the original, and the red toner image formed on the surface of the photosensitive drum 11 is transferred onto the cut sheet SH. When transfer of the red toner image is finished, the cut sheet SH is separated from the photosensitive drum 11 by the separating charger 16. The red toner image on the cut sheet SH is then fixed by heat and pressure by the fixing device 19.

The cut sheet SH on which the black and red information are recorded is delivered to the paper delivery tray 24 by the flapper 21.

Figure 11:
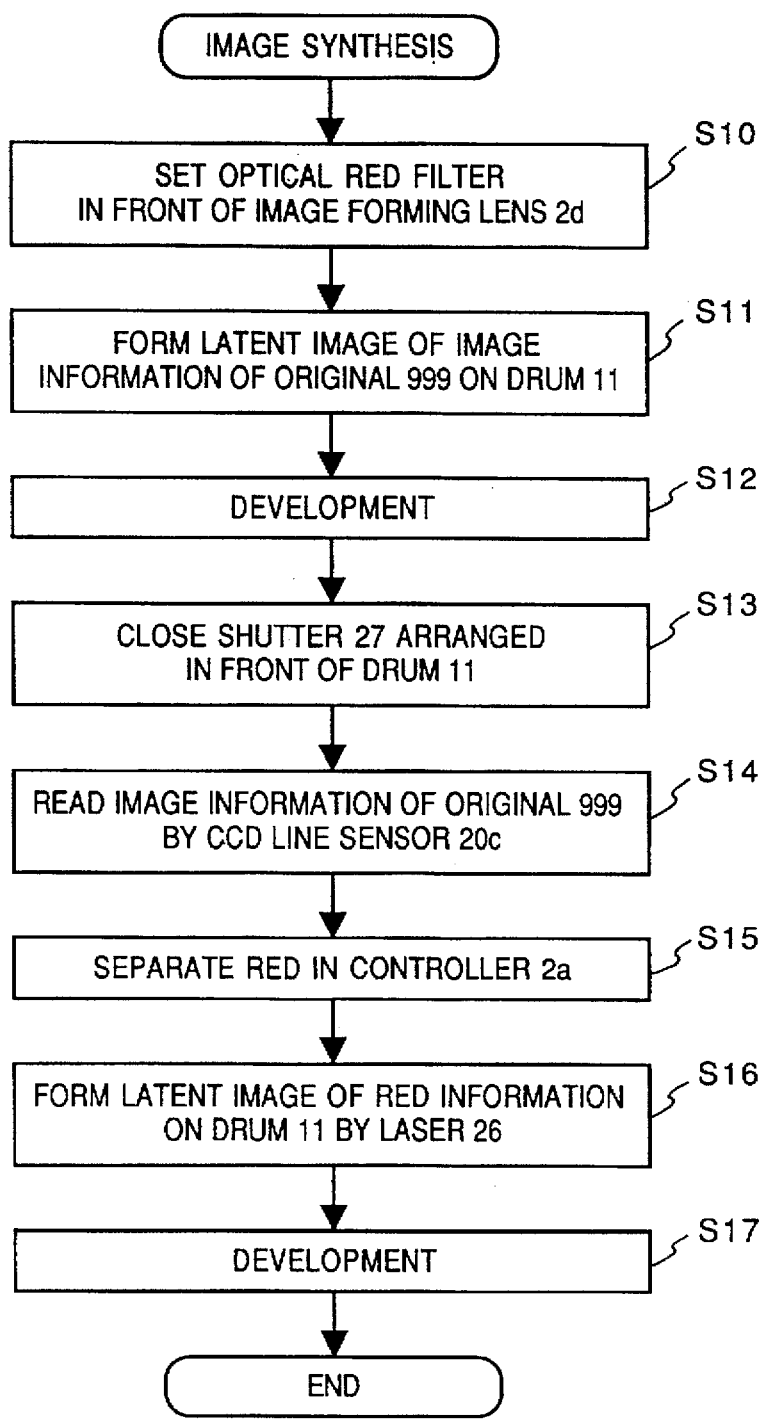
FIG. 11 is a flow chart showing a procedure of multiple development according to the embodiment.

The entire procedure of multiple development executed by the copying apparatus according to this embodiment will be described below with reference to a flow chart shown in FIG. 11.

First, an image formed by erasing a red analog image from the original 999 is reproduced. That is, to separate a red image from a black image, the red filter 20d is set in front of the image forming lens 2d (step S10).

Subsequently, the original 999 is exposed by the original exposing lamp 2c and the scanning mirror. The light reflected by the original 999 passes through the red filter 20d to form image information from which red image information of the original 999 is erased. An image of this image information is formed on the photosensitive drum 11 through the image forming lens 2d, forming a latent image corresponding to the image from which the red image is removed (step S11). This latent image is developed in black by the developing unit 13b (step S12).

Subsequently, on the basis of an electrophotographic process, the developed black image is transferred to the conveyed cut sheet SH. The cut sheet SH is then separated from the photosensitive drum 11 by the separating charger 16, and the black developer is fixed by heat and pressure by the fixing device 19.

The flapper 21 controls the conveyance direction of the cut sheet SH on which the black image information is recorded as described above. That is, the cut sheet SH is conveyed to the register rollers 12 through the conveyor paths 22 and 22a constituting a multipath in order to prepare for the next image recording. To prepare for recording of the next red image (digital image recording), the exposure shutter 27 arranged in front of the photosensitive drum 11 is closed (step S13). As a result, optical information from the image forming lens 2d is no longer formed on the photosensitive drum 11.

The original 999 is again exposed by the original exposing lamp 2c and the scanning mirror. An image of the light reflected by the original 999 is formed on the line sensor 20c through the half mirror 20a and read by the line sensor 20c (step S14). The electrical signal thus photoelectrically converted by the line sensor 20c is supplied to the controller 2a, and color separation of red is performed as described above (step S15). The separated red image information is supplied to the laser driver 260. The laser driver 260 modulates the semiconductor laser in accordance with the red image information. The laser from the semiconductor laser is scanned by the polygon mirror 25a to form a red latent image on the photosensitive drum 11 (step S16).

Subsequently, the latent image is developed in red by the developing unit 13a (step S17) and transferred onto the cut sheet SH which is fed again. The cut sheet SH on which the red developer is transferred is separated from the photosensitive drum 11 by the separating charger 16, and the developer is fixed by the fixing device 19.

The cut sheet SH on which the image information is synthesized and recorded in black and red by the multiple processing as described above is delivered to the paper delivery tray 24 by the flapper 21, thereby ending the multiple development.

6. Marker processing

In a marker processing mode of detecting an area surrounded by a color marker and performing predetermined processing for an image in that area, as shown in FIG. 5, the CPU 42a receives the color area signals 310A, 310B, and 310C from the color discriminating circuit 140, identifying an area surrounded by a marker. In a masking mode in which an image in an area sand an ed by a red marker is erased and an image except for that image is reproduced, the CPU 42a causes the scanning unit to pre-scan an original to obtain an image from the CCD. The CPU 42a then receives the red area signal 310A from the color discriminating circuit 140, identifying an area surrounded by a red marker. Thereafter, the CPU 42a selects a signal 410 by using a signal 400, causing the scanning unit to again scan the original, and receiving an image from the CCD. If the area surrounded by the red marker which is identified by the pre-scan is detected, the CPU 42a selects the fixed value Y of the selector 170 by using the signal 410. If an image except for that area is detected, the CPU 42a selects the signal 340 by using the signal 410. In this manner, the CPU 42a executes the marker processing mode.

As has been described above, the number of pixels or the weighting coefficients used in smoothing are changed between the mode of outputting an image within the range of a predetermined color and the mode of detecting an area surrounded by a color marker, thereby switching the levels of the erroneous discrimination eliminating processing. This makes copying of two colors, red and black, faithful to an original possible.

In the above embodiment, if the color of the filter for color separation can be selected in accordance with the color of the developer set in the developing unit 13a, an image corresponding to the developer color can be recorded as a digital image while being synthesized on an analog image. That is, printing of two colors, black and blue, can be performed by setting a blue developer in the developing unit 13a. It is also possible to perform three-color printing using black, red, and blue, or multicolor printing using further additional developer colors.

<Modification>

A modification of the above embodiment will be described below.

Figure 12:
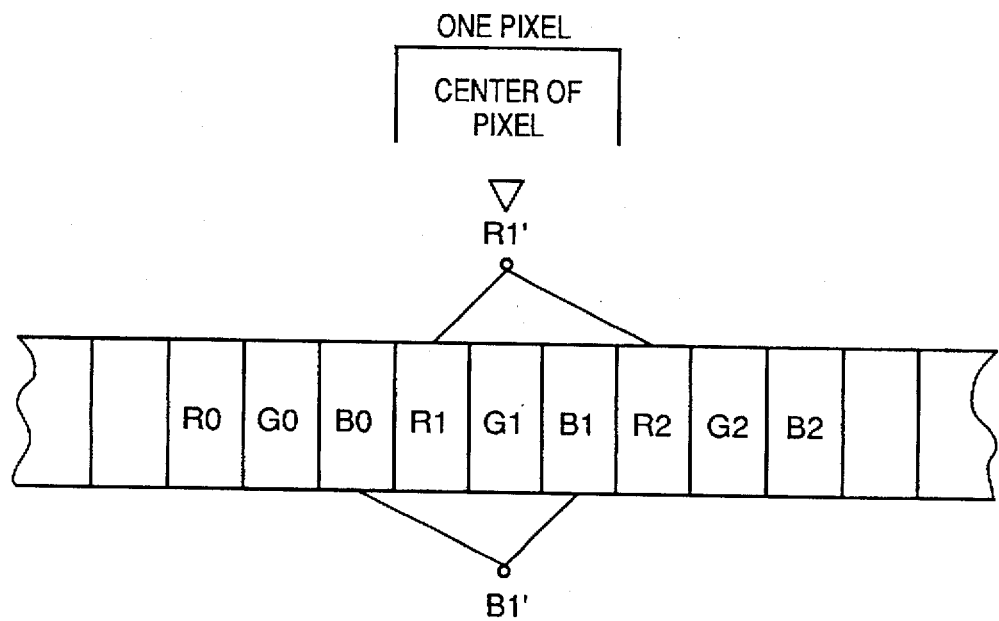
FIG. 12 is a schematic view showing an in-line sensor on which filters of three colors, R, G, and B are coated according to a modification of the embodiment.

FIG. 12 is a schematic view showing an in-line sensor on which filters of three colors, red (R), green (G), and blue (B) are coated, in a copying apparatus according to the modification of the above embodiment.

In positional difference correction for color pixels of the line sensor shown in FIG. 12, the following interpolations are performed in order to match R and B with the position of G1:

$$R1'=(2R1+R2)/3 \qquad (3)$$

$$B1=(B0+2B1)/3 \qquad (4)$$

As in the above embodiment, the values of these arithmetic operations are subjected to smoothing in the stage before the color discriminating circuit, thereby reducing the possibility of erroneous discrimination. At the same time, binarization is performed by using image signals not subjected to the smoothing.

The operation of the overall apparatus according to this modification is identical with that of the above embodiment, and so a detailed description thereof will be omitted.

The present invention can be applied to either a system comprising a plurality of components or an apparatus including only one component. The present invention is of course applicable to an arrangement achieved by supplying programs to an apparatus or a system.

As has been described above, in the mode of detecting an area surrounded by a color marker, the level of erroneous discrimination eliminating processing can be so selected as to eliminate erroneous discrimination of a color marker. This makes image processing faithful to an original possible, in which no deterioration occurs in portions of characters or thin lines in an image.

As many apparently widely different embodiments of the present invention can be made without departing from the spirit and scope thereof, it is to be understood that the invention is not limited to the specific embodiments thereof except as defined in the claims.

What is claimed is:

1. An image processing apparatus comprising:
    color separating means for separating colors of an input image to output color image data;
    smoothing means for smoothing the color image data outputted from said color separating means;
    discriminating means for discriminating areas of a color image on the basis of the smoothed color image data from said smoothing means; and
    image processing means for processing the input image in accordance with the discrimination result from said discriminating means,
    wherein said image processing means is operable in either a first image processing mode or a second image processing mode, these modes being different from each other with respect to image processing of areas discriminated by said discriminating means, and wherein said smoothing means changes a degree of smoothing in accordance with the image processing mode of said image processing means.

2. The apparatus according to claim 1, wherein said smoothing means performs first smoothing in the first image processing mode and second smoothing in the second image processing mode.

3. The apparatus according to claim 2, wherein said first image processing mode is a color-copying mode, said second image processing mode is a marker-editing mode, and said first smoothing is a lower degree of smoothing than said second smoothing which is a higher degree of smoothing.

4. The apparatus according to claim 1, wherein said separating means output color image data consisting of a plurality of pixel data, and wherein said smoothing means calculates pixel data of a pixel of interest and pixel data of pixels around the pixel of interest, thereby obtaining smoothed pixel data of the pixel of interest.

5. The apparatus according to claim 4, wherein said smoothing means changes the number of pixels around the pixel of interest, which is used as a factor of the calculation, in accordance with the image processing mode of said image processing means.

6. The apparatus according to claim 4, wherein said smoothing means changes weights to be multiplied with the pixel of interest and the pixels around the pixel of interest in accordance with the image processing mode of said image processing means.

7. The apparatus according to claim 1, wherein said discriminating means discriminates areas of a color image by determining whether the value of the color image data falls within a predetermined range, and changes the predetermined range in accordance with the image processing mode of said image processing means.

8. The apparatus according to claim 7, wherein said first image processing mode is a color-copying mode, said second image processing mode is a marker-editing mode, and said predetermined range in accordance with said second image processing mode is broader than said predetermined range in accordance with said first image processing mode.

9. The apparatus according to claim 1, further comprising reading means for reading out an image from an original and for supplying the read-out image as image data to said color separating means.

10. The apparatus according to claim 1, further comprising printing means for printing the processed image from said image processing means.

11. An image processing apparatus comprising:
    color separating means for separating colors of an input image to output color image data;
    discriminating means for discriminating areas of a color image by determining whether the value of the color image data outputted from said color separating means falls within a predetermined range; and
    image processing means for processing the input image in accordance with the discrimination result from said discriminating means,
    wherein said image processing means is operable in either a first image processing mode or a second image processing mode, these modes being different from each other with respect to image processing of areas discriminated by said discriminating means, and wherein said discriminating means changes the predetermined range in accordance with the image processing mode of said image processing means.

12. The apparatus according to claim 11, wherein said first image processing mode is a color-copying mode, said second image processing mode is a marker-editing mode, and said predetermined range in accordance with said second image processing mode is broader than said predetermined range in accordance with said first image processing mode.

13. The apparatus according to claim 11, further comprising reading means for reading out an image from an original and for supplying the read-out image as image data to said color separating means.

14. The apparatus according to claim 11, further comprising printing means for printing the processed image from said image processing means.

15. A copying apparatus comprising:
    reading means for reading an original image while separating color of the original image to thereby output color image data;
    smoothing means for smoothing the color image data outputted from said reading means;
    discriminating means for discriminating areas of a color image on the basis of the smoothed color image data from said smoothing means;
    image processing means for processing an input image in accordance with the discrimination result from said discriminating means; and
    printing means for printing the processed image from said image processing means,
    wherein said image processing means is operable in either a color-copying mode or a marker-editing mode, and wherein said smoothing means changes a degree of smoothing in accordance with the processing mode of said image processing means.

16. A copying apparatus comprising:
    reading means for reading an original image while separating colors of the original image to thereby output color image data;
    discriminating means for discriminating areas of a color image by determining whether the value of the color image data outputted from said reading means falls within a predetermined range;

image processing means for processing an input image in accordance with the discrimination result from said discriminating means; and printing means for printing the processed image from said image processing means, wherein said image processing means is operable in either a color-copying mode or a marker-editing mode, wherein in the color-copying mode, said discriminating means performs discrimination on the basis of a first predetermined range, and in the marker-editing mode, said discriminating means performs discrimination on the basis of a second predetermined range, and wherein either one of the first predetermined range or the second predetermined range includes a part of the other predetermined range.

17. An image processing apparatus comprising:

smoothing means for smoothing input color image data;

discrimination means for discriminating areas of a color image on the basis of the smoothed color image data from said smoothing means; and image processing means for processing the color image in accordance with the discrimination result from said discriminating means, wherein said image processing means is operable in either a first image processing mode or a second image processing mode, these modes being different from each other with respect to image processing of areas discriminated by said discriminating means, and wherein said smoothing means changes a degree of smoothing in accordance with the image processing mode of said image processing means.

18. The apparatus according to claim 17, wherein said smoothing means performs first smoothing in the first image processing mode and second smoothing in the second image processing mode.

19. The apparatus according to claim 18, wherein said first image processing mode is a color-copying mode, and said second image processing mode is a marker-editing mode, and said predetermined range in accordance with said second image processing mode is broader than said predetermined range in accordance with said first image processing mode.

20. An image processing apparatus comprising:

discriminating means for discriminating areas of a color image in an input image by determining whether the value of color image data in input image data falls within a predetermined range; and image processing means for processing the input image in accordance with the discrimination result from said discriminating means, wherein said image processing means is operable in either a first image processing mode or a second image processing mode, these modes being different from each other with respect to image processing of areas discriminated by said discriminating means, wherein in the first image processing mode, said discriminating means performs discrimination on the basis of a first predetermined range, and in the second image processing mode, said discriminating means performs discrimination on the basis of a second predetermined range, and wherein either one of the first predetermined range or the second predetermined range includes a part of the other predetermined range.

21. The apparatus according to claim 20, wherein said first image processing mode is a color-copying mode, said second image processing mode is a marker-editing mode, and said first predetermined range is broader than said second predetermined range.

22. An image processing method comprising the steps of:

separating colors of an input image to output color image data;

smoothing the color image data outputted in said separating step;

discriminating areas of a color image on the basis of the color image data smoothed in said smoothing step; and processing the input image in accordance with the discrimination result of said discriminating step, wherein said processing step is performed in either a first image processing mode or a second image processing mode, these modes being different from each other with respect to image processing of areas discriminated in said discriminating step, and wherein a degree of smoothing in said smoothing step is changed in accordance with said image processing mode.

23. An image processing method comprising the steps of:

separating colors of an input image to output color image data;

discriminating areas of a color image by determining whether the value of the color image data outputted in said separating step falls within a predetermined range; and processing the input image in accordance with the discrimination result of said discriminating step, wherein said processing step is performed in either a first image processing mode or a second image processing mode, these modes being different from each other with respect to image processing of areas discriminated in said discriminating step, wherein in the first image processing mode, said discriminating step performs discrimination on the basis of a first predetermined range, and in the second image processing mode, said discriminating step performs discrimination on the basis of a second predetermined range, and wherein either one of the first predetermined range or the second predetermined range includes a part of the other predetermined range.

24. A copying method comprising the steps of:

reading an original image while separating colors of the original image to thereby output color image data;

smoothing the color image data outputted in said reading step;

discriminating areas of a color image on the basis of the color image smoothed in said smoothing step;

processing an input image in accordance with the discrimination result of said discrimination step; and printing the processed image, wherein said processing step is performed in either a color-copying mode or a marker-editing mode, and a degree of smoothing in said smoothing step is changed in accordance with said processing mode.

25. A copying method comprising the steps of:

reading an original image while separating colors of the original image to thereby output color image data;

discriminating areas of a color image by determining whether the value of the color image data outputted in said reading step falls within a predetermined range;

processing an input image in accordance with the discrimination result of said discriminating step; and printing the processed image, wherein said processing step is performed in either a color-copying mode or a marker-editing mode, and wherein in the color-copying mode, said discriminating step performs discrimination on the basis of a first predetermined range, and in the marker-editing mode, said discriminating step performs discrimination on the basis of a second predetermined range, and wherein either one of the first predetermined range or the second predetermined range includes a part of the other predetermined range.

26. An image processing method comprising the steps of:
smoothing input color image data;
discriminating areas of a color image on the basis of the color image data smoothed in said smoothing step; and
processing the color image in accordance with the discrimination result of said discriminating step,
wherein said processing step is performed in either a first image processing mode or a second image processing mode, these modes being different from each other with respect to areas discriminated in said discriminating step, and wherein a degree of smoothing in said smoothing step is changed in accordance with said image processing mode.

27. An image processing method comprising the steps of:
discriminating areas of a color image in an input image by determining whether the value of color image data in input image data falls within a predetermined range; and
processing the input image in accordance with the discrimination result of said discriminating step,
wherein said processing step is performed in either a first image processing mode or a second image processing mode, these modes being different from each other with respect to areas discriminated in said discriminating step, wherein in the first image processing mode, said discriminating step performs discrimination on the basis of a first predetermined range, and in the second image processing mode, said discriminating step performs discrimination on the basis of a second predetermined range, and wherein either one of the first predetermined range or the second predetermined range includes a part of the other predetermined range.

28. An image processing apparatus comprising:
input means for inputting color image data;
smoothing means for smoothing the color image data inputted by said input means;
discriminating means for discriminating areas of a color image on the basis of the smoothed color image data from said smoothing means;
processing means for performing either editing processing on the color image data inputted by said input means, on the basis of the areas discriminated by said discriminating means, or second processing other than said editing processing on the color image data inputted by said input means, wherein during the editing process, the discriminating means performs discrimination on the basis of a first predetermined range and during the second processing the discriminating means performs discrimination on the basis of a second predetermined range, and wherein either one of the first predetermined range and the second predetermined range includes a part of the other predetermined range;
selecting means for selecting the editing processing or the second processing; and
control means for controlling said smoothing means in accordance with a processing selected by said selecting means.

29. The apparatus according to claim 28, wherein said smoothing means reduces noise of said color image data.

30. The apparatus according to claim 28, wherein said second processing comprises reproduction processing of a color image in accordance with the color image data inputted by said input means.

31. The apparatus according to claim 28, wherein said control means controls a degree of smoothing of said smoothing means in conformity with whether or not said processing means performs said editing processing.

32. An image processing method comprising the steps of:
inputting color image data;
smoothing the color image data inputted in said inputting step;
discriminating areas of a color image on the basis of the smoothed color image data obtained in said smoothing step;
performing either editing processing on the color image data inputted in said inputting step, on the basis of the areas discriminated in said discriminating step, or second processing other than said editing processing on the color image data inputted in said inputting step, wherein during the editing process, the discriminating step performs discrimination on the basis of a first predetermined range and during the second processing the discriminating step performs discrimination on the basis of a second predetermined range, and wherein either one of the first predetermined range and the second predetermined range includes a part of the other predetermined range;
selecting the editing processing or the second processing; and
controlling said smoothing step in accordance with a processing selected by said selecting step.

33. The method according to claim 32, wherein said smoothing step reduces noise of said color image data.

34. The method according to claim 32, wherein said second processing comprises reproduction processing of a color image in accordance with the color image data inputted in said inputting step.

35. The method according to claim 32, wherein said controlling step controls a degree of smoothing of said smoothing step in conformity with whether or not said processing step performs said editing processing.

36. An image processing apparatus comprising:
input means for inputting color image data;
smoothing means for smoothing the color image data inputted by said input means; and
processing means for performing either editing processing on the color image data inputted by said input means, on the basis of areas which are discriminated in accordance with the smoothed color image data from said smoothing means, or reproduction processing of reproducing a color image in accordance with the smoothed color image data from said smoothing means,
wherein said smoothing means applies a first degree of smoothing to the color image data on which said reproduction processing is to be performed and applies a second degree of smoothing, which is greater than the first degree of smoothing, to the color image data on which said editing processing is to be performed.

37. The apparatus according to claim 36, wherein said smoothing means reduces noise of said color image data.

38. An image processing method comprising the steps of:

inputting color image data;

smoothing the color image data inputted in said inputting step; and performing either editing processing on the color image data inputted in said inputting step, on the basis of areas which are discriminated in accordance with the smoothed color image data obtained in said smoothing step, or reproduction processing of reproducing a color image in accordance with the smoothed color image data obtained in said smoothing step, wherein in said smoothing step a first degree of smoothing is applied to the color image data on which said reproduction processing is to be performed and a second degree of smoothing is applied, which is greater than the first degree of smoothing, to the color image data on which said editing processing is to be performed.

39. The method according to claim 38, wherein said smoothing step reduces noise of said color image data.

* * * * *

UNITED STATES PATENT AND TRADEMARK OFFICE
CERTIFICATE OF CORRECTION

PATENT NO. : 5,748,345
DATED : May 5, 1998
INVENTOR(S) : HIDENORI OZAKI, et al.

It is certified that error appears in the above-identified patent and that said Letters Patent is hereby corrected as shown below:

COLUMN 1

Line 26, "modes" should read --modes,--.

COLUMN 7

Line 4, "cm μ" should read --cm=--.

COLUMN 13

Line 41, "output" should read --outputs--.

Signed and Sealed this

Nineteenth Day of January, 1999

Attest:

Attesting Officer

Acting Commissioner of Patents and Trademarks